United States Patent [19]

Keithler

[11] 4,154,617

[45] May 15, 1979

[54] SILICON COATING COMPOSITIONS AND METHOD OF PRODUCTION

[75] Inventor: William R. Keithler, Florissant, Mo.

[73] Assignee: Grow Chemical Corp., New York, N.Y.

[21] Appl. No.: 745,642

[22] Filed: Nov. 29, 1976

[51] Int. Cl.$^2$ .............................................. C09D 5/10
[52] U.S. Cl. ................................. 106/1.17; 106/1.29; 106/14.21; 106/287.13; 106/287.16; 260/448.8 A
[58] Field of Search ............. 106/1, 14, 287 SE, 38.3, 106/1.17, 1.29, 14.21, 287.13, 287.16; 260/448.8 A

[56] References Cited

U.S. PATENT DOCUMENTS

| | | | |
|---|---|---|---|
| 3,232,771 | 2/1966 | Pearce | 106/38.35 |
| 3,392,036 | 7/1968 | McLeod | 106/1 |
| 3,730,743 | 5/1973 | McLeod | 106/1 |
| 3,759,852 | 9/1973 | Bradley | 106/291 |
| 4,014,703 | 3/1977 | Hayati et al. | 106/1 |

Primary Examiner—Lorenzo B. Hayes
Attorney, Agent, or Firm—Burton, Parker & Schramm

[57] ABSTRACT

Described is a method for producing inorganic silicon containing compositions of improved stability and hardness comprising the steps of:

1. providing a mixture of an organo silicate or a partial hydrolysate thereof in a solvent therefor;
2. adding a weak acid to said mixture and maintaining the pH acidic, preferably at a range from about 1 to about 4;
3. partially hydrolyzing the mixture; and
4. adding a strong acid to said mixture to further hydrolyze the mixture.

The product of the process is used in inorganic galvanic action coating compositions as well as used with glass flake containing compositions.

9 Claims, No Drawings

SILICON COATING COMPOSITIONS AND METHOD OF PRODUCTION

BACKGROUND OF THE INVENTION

Zinc-rich coatings have been described in a current technology review in *Modern Paint Coatings*, June 1975, pages 19–26. Zinc-rich primers are taught in U.S. Pat. No. 3,505,099 wherein a tetraalkoxy silane is reacted with a strong acid as hydrochloric acid to obtain the hydrolysis product in the presence of water. Partially hydrolyzed silicates are taught in U.S. Pat. No. 3,392,036. U.S. Pat. No. 3,056,684 teaches protective coating containing zinc-rich coating compositions also containing hydrolyzed tetraethyl orthosilicate. Other zinc-rich coating compositions are taught in U.S. Pat. Nos. 3,202,517 and 3,730,743. Priming agents for silicon coatings are also taught in U.S. Pat. No. 3,108,898. U.S. Pat. No. 3,759,852 teaches protective coatings containing glass pigment where the coating composition is normally an organic resin binder vehicle. U.S. Pat. No. 3,634,109 teaches inorganic zinc rich coating compositions containing monoethanolamine plus an organic acid to form salts of said amine. Other references that are teachings in silicon containing compositions are as follows: U.S. Pat. Nos. 2,686,654; 3,108,898; 3,377,309; 3,455,609; 3,560,244 (similar to 3,505,099); 3,615,780; 3,620,784; 3,649,307; 3,721,574; 3,769,050; and 3,784,407.

SUMMARY OF THE INVENTION

It is an object of the present invention to prepare a silicon containing composition that has a high stability and improved initial hardness over existing compositions. In addition, the silicon containing materials are the basis for coating compositions which have particularly high thermal stability.

Described is a process for producing a silicate composition having improved stability comprising the steps:
1. providing a mixture of an organo silicate and/or a partially hydrolysate thereof in a solvent therefor, which solvent is miscible with water;
2. adding a weak acid to said mixture and maintaining the pH acidic, preferably at a range of about 1 to 4;
3. partially hydrolyzing the mixture; and
4. adding a strong acid to said mixture to further hydrolyze the mixture.

It has been generally thought in the art that when one adds hydrochloric acid or other strong acid to a tetraethylorthosilicate that gellation would occur. In this case, however, after the initial reaction of the reactant silicate with a weak acid that the use of a strong acid increases the stability of the final product rather than causing gellation.

DESCRIPTION OF PREFERRED EMBODIMENT

The silicates that may be employed in the present position are generally alkoxy silicate such as tetraalkoxysilicate where the alkyl group ranges from 1 to 10 carbon atoms such as methyl, ethyl, butyl, nonyl and the like. The most preferred silicate is tetraethylsilicate.

In the formation of the mixture in the first step of the process, the solvent that may be employed for solubilizing the organosilicate is any solvent that is water miscible. Generally the solvent may be monoalkylene glycol monoalkyl ethers, dialkylene glycol monoalkyl ethers, dialkylene glycol, dialkyl ether and monoalkylene glycol dialkyl ether wherein the alkyl groups preferably range from 1 to 6 carbon atoms and the alkylene groups range from 2 to 4 carbon atoms such as Cellosolve (trademark of Union Carbide for ethylene glycol monoethyl ether), Cellosolve acetate and the like. Other solvents that may be employed are saturated aliphatic ketones such as methylethyl ketone, saturated aliphatic alcohol, such as alkanols of from 1 to 6 carbons as methanol, propanol, butanol and the like.

In the first step of the reaction, where the weak acid is added to the mixture of organo silicate in the solvent, an exotherm occurs. Normally the reaction may take place at room temperature, but the temperature is slightly raised due to the exotherm during reaction. If desired, the mixture may be heated to reflux temperature.

The weak acid that is employed would be any weak acid that would facilitate the hydrolysis reaction. By "weak acid" is meant any acid which has a pKa value (negative logarithym of the acidic dissociation constant) or more than one (0.1). A "strong" acid is one that has a pKa value of less than one (1.0). While applicant does not wish to be held to any theory, it is believed that the alkoxy group attached to the silicon atom may be replaced by a hydroxyl group. Suitable weak acids are organo carboxylic acid compounds as the mono- or dicarboxylic acids such as carboxylic acids containing up to 12 carbon atoms, including aliphatic and aromatic and cycloaliphatic systems. The aliphatic monocarboxylic acids that may be employed are formic, acetic, pentanoic, and the like, aromatic acids are phthalic (ortho, meta, or para), benzoic and the like. The aliphatic dicarboxylic acids are oxalic, malonic, succinic, glutaric, adipic and the like and other polycarboxylic acids as citric and the like wherein the total number of carbon atoms is up to 12. Other weak acids that may be employed are inorganic weak acids such as phosphoric, boric and the like.

During the hydrolysis reaction, water is added in a quantity sufficient to give the desired extent of hydrolysis. Preferably, the amount of water that is added is in a range equivalent to 0.30 to 0.95 of the stoichiometric amount needed for complete hydrolysis of the reactant, with 0.95 being the preferred amount.

Generally, after the weak acid has been added to the solution, a 24-hour holding period is employed in order to permit the hydrolysis reaction to take place. Thereafter the strong acid is added thereto.

The strong acids that may be employed are normally mineral acids such as hydrochloric acid and the like. In general, the reaction time is approximately two hours. Thereafter the product may be used for its normal purpose.

After the stabilized product has been obtained it may then be mixed with a particulate metal powder on approximately a 2–4:1 weight basis of metal:condensed silicate composition. The metal has a particulate size ranging from about 4 microns to about 10 microns. The purpose of the metal is to provide a galvanic action coating composition so that as moisture causes corrosion of the object, the metal added to the composition will decompose rather than the substrate upon which the coating has been applied. The metal that may be employed is one that is above iron in the electromotive series such as zinc or aluminum.

A glass flake containing composition can also be prepared by mixing the glass flake in the amount of 0.1 to 1.0 parts by weight per part of silicon containing composition.

While Applicant does not wish to be held to any theory, it is believed that the glass flakes leaf during the formation of the film. By "leafing" is meant that the glass flakes migrate toward the surface of the film and form a barrier to prevent moisture from moving past the barrier. Leafing glass flakes have been described in U.S. Pat. No. 3,759,852, which is hereby incorporated by reference. While the precise operation of the leafing agent is not know, it has been found desirable to treat commercially available glass flakes with a high molecular weight fatty acid. The glass flakes range in size from micron range to millimeter range.

It has been found that an all inorganic silicon coating composition can be formulated employing the glass flakes. The composition can be used to protect metallic substrates susceptible to corrosion. In that situation, one may use any of the usual silicon containing compositions, i.e., the condensation reaction product of water and alkoxy silicates, described above regardless of the method of preparation. Most preferably the condensation reaction employs the two-step process described herein, i.e., the reaction with a weak acid and then reacting the product with a strong acid.

It is to be appreciated that the silicon containing composition of the present invention may have other non film forming components therein such as pigments, dryers, fillers and the like may be added in accordance with usual custom for formulating a coating for a particular use such as to assist in building up the thickness of the coating.

| Material | Preferred Parts/Weight | Range Parts/Weight |
|---|---|---|
| Silicate Reactant | 100 | 1 |
| Solvent | 50 | 0.05–1.0 |
| $H_2O$ | 10 | Less than Stoichiometric amount |
| Weak acid | 1 | 0.01–0.02 |
| Strong acid | 2–4 | 0.01–0.06 |

The coating compositions of the present invention may be applied in the normal manner as by roll, dip, spray or brush, with spray application preferred. The coating thickness may range from about 1 to 10 mils.

EXAMPLE I

| Formulation | Parts (by Weight) |
|---|---|
| Tetra ethyl ortho silicate | 100.0 |
| 10% Citric acid in ethanol (pKa = 3.13) | 10.0 |
| Ethylene glycol monoethyl ether (anhydrous) | 50.0 |
| Water | 10.0 |
| 37% Hydrochloric acid (pKa = −6.1) | 2.5 |

The citric acid solution was added to the previously combined ethylene glycol monoethyl ether and tetra ethyl ortho silicate as 25° C. (ambient room temperature). The water was added and the composition was mixed for five minutes, then the container was sealed and allowed to stand for 24 hours. During this time there was an exotherm and slight pressure build-up. The container was opened and the hydrochloric acid was added. The mixture was agitated for 5 minutes, then resealed. A second exotherm occurred. After cooling, it was ready for use as evidenced by the hard film formed (3 mils-2H hardness) with particulate zinc in a ratio of 3 parts by weight zinc dust to 1 part by weight binder. In both accelerated and actual testing, binder had a shelf life of over two years.

EXAMPLE II

The binder composition of Example I was mixed with particulate zinc (4–5 microns, calcium-free) in a ratio of 300 parts zinc to 100 parts binder to 15 parts micaceous iron oxide, in a ratio of 250 parts zinc to 100 parts binder to 25 parts fibrous calcium silicate and 350 parts zinc to 100 parts binder to 25 parts micaceous iron oxide to form three finished coating compositions. Each was applied by spray to sandblasted steel substrate. All coatings (3 mils thickness dry) evidenced excellent adhesion, passed salt spray tests as designed by Mil-R-38336, passed hardness tests in less than 1 hour after application and shelf life from extrapolated data indicate a shelf life in excess of two years.

EXAMPLE III

A binder consisting of tetra ethyl ortho silicate hydrolyzed with only 0.25 equivalent water was prepared as follows:

| Formulation | Parts by Weight |
|---|---|
| Tetra ethyl ortho silicate | 100.0 |
| 10% Oxalic acid (pKa = 1.27) | 10.0 |
| Ethylene glycol monoethyl ether | 50.0 |
| Water | 4.0 |
| 37% Hydrochloric acid (pKa = −6.1) | 2.8 |

The oxalic acid solution was added to the previously combined ethylene glycol mono methyl ether and tetra ethyl ortho silicate at 25° C. (ambient room temperature). The water was added and the composition was mixed for five minutes, then the container was sealed and allowed to stand 24 hours. Hydrochloric acid was added and container was then resealed. Composition was ready for use after two hours as evidenced by the hard (2H hardness - 3 mils thickness dry) solvent resistant film formed with particulate zinc in a ratio of 3 parts zinc to 1 part binder by weight. Extrapolated data from accelerated testing indicates a shelf life in excess of 3 years. Mixed zinc and binder have a a pot life or working time in excess of 1 week.

EXAMPLE IV

The composition of Example I was mixed with a leafing glass flake in a ratio 10 parts by weight to 100 parts by weight binder to 0.5 parts by weight zinc oxide, in a ratio of 50 parts by weight glass to 100 parts by weight binder to 0.5 parts by weight zinc oxide and 100 parts by weight glass to 100 parts by weight binder to 0.5 parts by weight zinc oxide to form three finished coating compositions. Each was applied by spray, to sandblasted steel substrate. All coatings (3 mils thickness dry) evidenced excellent adhesion and had good resistance to spot tests of 37% hydrochloric acid, 98% sulfuric acid, 70% nitric acid and glacial acetic acid.

EXAMPLE V

An example showing the instability of similarly prepared coating compositions (using strong acids) and the inferiority of the zinc-rich coating composition produced therefrom.

| Formulation | Parts by Weight |
|---|---|
| Tetra ethyl ortho silicate | 100.0 |
| 37% Hydrochloric acid (pKa = −6.1) | 2.7 |
| Water | 8.3 |
| Ethylene glycol monoethyl eter | 50.0 |

In accelerated aging tests, this binder had an actual shelf life of less than 2 weeks. A mixture consisting of this binder 1 part by weight to particulate zinc 3 parts by weight gave a coating composition which produced a hard film (2H after 1 hour dry) but pot life or working time was less than 30 minutes and films with thickness exceeding 4 mils "mud-cracked" severely.

EXAMPLE VI

The binder composition of Example I was mixed with particulate zinc in a ratio of 300 parts zinc to 100 parts binder to 15 parts micaceous iron oxide. This coating composition was applied, by spray, to a sandblasted steel substrate and over-coated with a composition consisting of 100 parts by weight binder composition of Example I, 50 parts by weight glass flake and 0.5 parts by weight zinc oxide. Test results indicate this coating system is resistant to strong acids and temperatures up to and exceeding 1600° F. (871° C.). The binder and zinc alone will not resist strong acids and will oxidize at temperatures exceeding 750° F.

What is claimed is:

1. A process for producing a silicon coating composition of improved stability and hardness comprising the steps:
   1. providing a mixture of a tetra alkoxy silicate, wherein the alkoxy groups contain from one to ten carbon atoms or a partial hydrolysate thereof in a solvent which is miscible with water;
   2. adding a weak acid to said mixture and maintaining an acidic pH;
   3. partially hydrolyzing the mixture by adding water thereto; and
   4. adding a strong acid to said mixture to further hydrolyze the mixture.

2. The process of claim 1 wherein the weak acid is an organic carboxylic acid having up to 12 carbon atoms.

3. The process of claim 1 wherein the strong acid is a mineral acid.

4. The process of claim 1 wherein the amount of water added is less than the stoichiometric amount of water necessary to completely hydrolyze the silicon reactant.

5. The method of claim 4 wherein the amount of water added is up to 0.95 of the stoichiometric amount required for complete hydrolysis.

6. A stabilized silicon containing coating composition comprising a water miscible solvent and a hydrolyzed silicate which hydrolysis product is prepared by a two step process, the first step comprising adding a weak acid to a mixture of organo silicon containing composition in a solvent thereof and maintaining the pH acidic; partially hydrolyzing the mixture, and adding a strong acid to said mixture to further hydrolyze said mixture, wherein the organo silicon material is a tetra alkoxy silicate or a partial hydrolysate wherein the alkoxy group contains from one to ten carbon atoms.

7. The coating composition of claim 6 further containing metallic oxides.

8. The coating composition of claim 6 further containing glass flakes.

9. The coating composition of claim 8 further containing particulate zinc.

* * * * *